United States Patent [19]

Shimokura

[11] Patent Number: 4,535,877
[45] Date of Patent: Aug. 20, 1985

[54] HYDRAULIC DAMPER OF ADJUSTABLE DAMPING FORCE TYPE

[75] Inventor: Akihiro Shimokura, Tokyo, Japan

[73] Assignee: Tokico Ltd., Kanagawa, Japan

[21] Appl. No.: 513,272

[22] Filed: Jul. 13, 1983

[30] Foreign Application Priority Data

Jul. 14, 1982 [JP] Japan .............................. 57-106598[U]
Jul. 14, 1982 [JP] Japan .............................. 57-106599[U]

[51] Int. Cl.³ .............................................. F16F 9/44
[52] U.S. Cl. .................................... 188/319; 137/599; 137/614.2
[58] Field of Search .................. 188/319; 267/127; 137/599, 614.2

[56] References Cited

U.S. PATENT DOCUMENTS

| 1,267,532 | 5/1918 | Flentje | 188/319 X |
| 2,090,755 | 8/1937 | Hodpera | 137/599 X |
| 2,780,321 | 2/1957 | Sturari | 188/319 |
| 2,948,357 | 8/1960 | Cookson | 137/614.2 X |
| 3,351,160 | 11/1967 | DeKoning et al. | 188/319 |
| 3,365,003 | 1/1968 | Willich | 188/319 |
| 3,559,776 | 2/1971 | Schultze | 188/319 X |
| 4,159,756 | 7/1979 | Murakami et al. | 188/319 |
| 4,313,529 | 2/1982 | Kato et al. | 188/319 X |
| 4,372,343 | 2/1983 | Trinkwalder, Jr. | 137/614.2 |

FOREIGN PATENT DOCUMENTS

| 571871 | 1/1958 | Italy | 188/319 |
| 24635 | 2/1983 | Japan | 188/319 |
| 585681 | 2/1947 | United Kingdom | 188/319 |
| 1207706 | 10/1970 | United Kingdom | . |
| 1467505 | 3/1977 | United Kingdom | . |

Primary Examiner—George E. A. Halvosa
Attorney, Agent, or Firm—Wenderoth, Lind & Ponack

[57] ABSTRACT

A hydraulic damper of the adjustable damping force type includes a piston working in a cylinder and partitioning the interior of the piston into two liquid chambers, a first passage provided in the piston for connecting the two liquid chambers, a first damping force generating valve mechanism provided on the piston for generating a damping force in response to liquid flow in the first passage, a by-pass passage for connecting the two liquid chambers and by-passing the first passage, and an adjusting valve for controlling the effective passage area of the by-pass passage. A second damping force generating valve mechanism is provided in the by-pass passage and generates a damping force substantially smaller than the damping force of the first damping force generating valve mechamism.

6 Claims, 11 Drawing Figures

HYDRAULIC DAMPER OF ADJUSTABLE DAMPING FORCE TYPE

BACKGROUND OF THE INVENTION

This invention relates to a hydraulic damper of adjustable damping force type.

Recent automotive vehicles such as passenger cars tend to adopt hydraulic dampers of adjustable damping force type in suspension systems thereof. The driving comfort of the vehicles can be improved by changing damping force characteristics of hydraulic dampers in response to the condition of the road on which the vehicles are running and to the running speed thereof. Namely, when a vehicle is running on a smoothly paved road it is desired the reduce the damping force and when the vehicle is running on a rough road it is desired to increase the damping force.

Typically, such hydraulic dampers of adjustable damping force type comprise a piston working in a cylinder and partitioning the interior thereof into two liquid chambers, a piston rod secured to the piston and extending through one of the two liquid chambers and to the outside of the cylinder, a first passage formed through the piston for communicating the two liquid chambers, a damping force generating valve mechanism for controlling the liquid flow through the first passage, a by-pass passage formed in the piston rod for communicating the two liquid chambers separately from the first passage, and an adjusting valve operable from the outside of the cylinder and controlling the liquid flow through the by-pass passage. The adjusting valve acts to change the effective passage area of the by-pass passage, whereby the amount of the liquid flowing through the damping force generating valve mechanism and the damping force of the damper is adjusted both in the extension and contraction strokes of the damper. The by-pass passage constitutes an orifice of adjustable cross-sectional area and, thus, changes the increasing portion in the respective damping force-piston speed diagram. When the damping force increases to a predetermined level, the damping force generating valve on the piston opens, and the damping force is determined by the characteristics of the valve mechanism which is not substantially affected by the characteristics of the by-pass passage. In other words, the adjustment is only performed on the inclination of the increasing portion of the diagram, and is not performed on the damping force when the damping force generating valve is open.

Thus, it has recently been required to adjust the damping force of the hydraulic damper over the entire working range of the damper.

SUMMARY OF THE INVENTION

The object of the present invention is to satisfy such requirements, and the invention provides a hydarulic damper comprising a piston working in a cylinder and partitioning the interior thereof into two liquid chambers, a piston rod secured to the piston and extending to the outside of the cylinder, a first passage for connecting the two liquid chambers, a first damping force generating valve mechanism provided in the first passage for generating a relatively high damping force, a second passage for connecting the two liquid chambers, a second damping force generating valve mechanism provided in the second passage for generating a relatively low damping force, and an adjusting valve mechanism provided in the piston rod and controlling the effective passage area of the second passage.

When the second passage is closed by actuating the adjusting valve mechanism from the outside of the damper, the damping force is determined by the first damping force generating valve mechanism and is high. When the second passage is opened by actuating the adjusting valve mechanism from the outside of the damper, the liquid may flow both in the first and second passage. However, the liquid flow through the first passage is substantially smaller than the liquid flow through the second passage and the damping force is substantially determined by the second damping force generating valve mechanism.

Preferably, the first passage is formed through the piston and the second passage is provided in the inner end portion of the piston rod.

BRIEF DESCRIPTION OF THE DRAWINGS

Further objects and advantages of the invention will become apparent from the following detailed description with reference to the accompanying drawings which exemplify some preferred embodiments of the invention and, in which.

DETAILED DESCRIPTION OF THE PREFERRED EMBODIMENTS

FIG. 1–FIG. 4 show a hydraulic damper of adjustable damping force type according to a first embodiment of the invention, and the damper comprises a dual-tube housing 1 having an inner tube or cylinder 2 and an outer tube 3. A piston 5 secured to the lower or inner end of a piston rod 4 works in the cylinder 2 and partitions the interior of the cylinder 2 two liquid chambers $R_1$ and $R_2$. A hollow nut 6 is screw-threadingly connected to the lower end of the piston rod 4 to secure the piston 5 to the piston rod 4. Two sets of axially extending holes 7 and 8 are formed through the piston to communicate the two liquid chambers $R_1$ and $R_2$. The holes 7 are normally closed by a damping force generating disc valve 9 which cooperates with the upper side surface of the piston 5, and the holes 8 are normally closed by a damping force generating disc valve 11 cooperating with the lower side surface of the piston 5. The disc valve 9 opens when the pressure in the lower chamber $R_2$ exceeds the pressure in the upper chamber $R_1$ by a predetermined amount, and the disc valve 11 opens when the pressure in the upper chamber $R_1$ exceeds the pressure in the lower chamber $R_2$ by a predetermined amount. The holes 7 and 8 constitute a first communicating passage $L_1$ according to the invention, and the disc valves 9 and 11 constitute a first damping force generating valve mechanism according to the invention. In this embodiment, the disc valves 9 and 11 consist respectively of two or more mutually overlapping annular resilient discs, the resiliency thereof being assisted respectively by springs 10 and 12. However, such springs 10 and 12 may be omitted and the disc valves 9 and 11 may be replaced by any suitable damping force generating valves known per se. The first damping force generating valves mechanism 9, 11 generates a relatively high damping force in response to the upward and downward movement of the piston and, is designated by reference numeral 13. Further, there is provided an orifice passage 15 between one of the holes 7 and the upper chamber $R_1$ for permanently communicating the two chambers $R_1$ and $R_2$.

Figure 1:
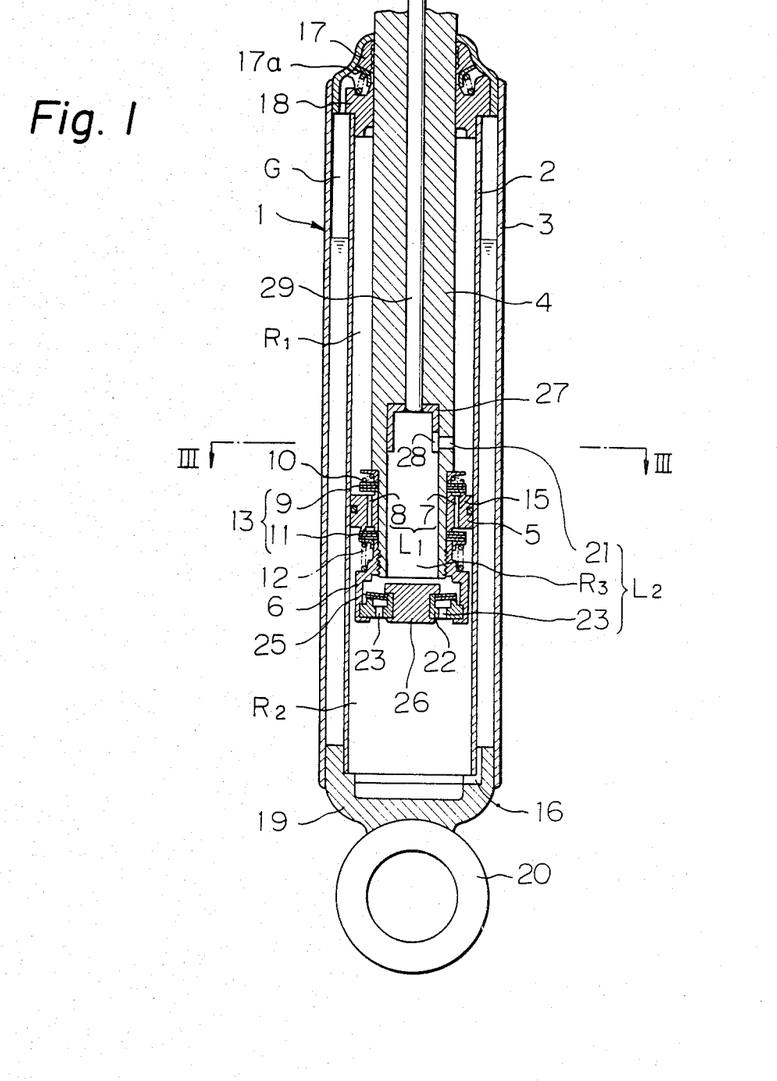
FIG. 1 is a longitudinal sectional view of a hydraulic damper according to the invention.

As shown in FIG. 1, there is provided a lower cap 19 closing the lower end of the outer tube 3, and a mounting ring 20 is secured to the lower cap 19 for mounting the damper on such as a wheel axle of an automotive vehicle. The upper end of the inner tube 2 is closed by a rod guide 18 which slidably receives the piston rod 4. The upper end of the outer tube 3 is closed by an upper cap, and a seal 17 is disposed on the inner surface of the upper cap and receives slidably and sealingly the piston rod 4 to seal the interior of the outer tube 3 from the outside. An annular resilient check valve 17a is disposed between the inner surface of the seal 17 and the rod guide 18 and encircles the piston rod 4. An annular space defined between the inner and outer tubes 2 and 3 constitutes a reservoir chamber, and pressurized gas G is filled in the upper portion of the reservoir chamber. The lower portion of the reservoir chamber and the liquid chambers $R_1$ and $R_2$ receive therein hydraulic liquid such as oil and the lower end portion of the reservoir chamber is communicated permanently with the lower end of the lower chamber $R_2$ through a passage 16. The check valve 17a permits fluid flow from the liquid chamber $R_1$ to the upper portion of the reservoir chamber and prevents fluid flow in the opposite direction.

Figure 2:
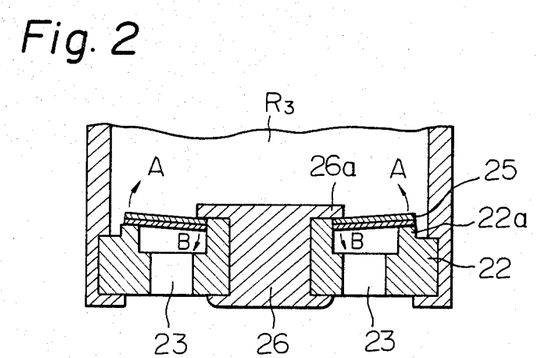
FIG. 2 is an enlarged partial view of a portion of FIG. 1 and showing a second damping force generating valve mechanism in FIG. 1.

A hollow portion is provided in the lower end of the piston rod 4, and the hollow portion cooperates with the hollow nut 6 to define an internal chamber $R_3$. The chamber $R_3$ is communicated with the upper chamber $R_1$ through a radial hole 21 formed in peripheral wall of the piston rod 4, and the communication therebetween is controlled by a cylindrical valve member 27, which constitutes an adjusting valve according to the invention, rotatably engages with the inner surface of the peripheral wall of the piston rod and has a cutout portion 28 to cooperate with the hole 21. The chamber $R_3$ is also communicated with the lower chamber $R_2$ through a second damping force generating valve mechanism 25 which, as shown in FIG. 2, consists of an annular resilient disc, a generally cylindrical valve seat member 22 secured to the hollow nut 6 and having an outer annular valve seat 22a for cooperating with one side surface (the lower side surface in the drawing) of an outer circumferential portion of the annular disc, and a valve retaining member 26 secured to the valve seat member 22 and having an inner annular valve seat 26a to cooperate with the other side surface (the upper side surface) of the inner circumferential portion of the annular disc. In the drawing the resilient annular valve disc consists of two mutually overlapping sheets, but the number of the sheets may be determined as desired. In the normal unactuated condition, the valve disc contacts with the inner and outer valve seats 26a and 22a. When the pressure in the chamber $R_3$ exceeds the pressure in the chamber $R_2$ by a predetermined amount the inner circumference of the valve disc deflects downwardly as shown by arrows B in FIG. 2 to separate from valve seat 26a, and when the pressure in the chamber $R_2$ exceeds the pressure in the chamber $R_3$ by a predetermined amount the outer circumference of the valve disc deflects upwardly as shown by arrows A in FIG. 2 and separates from the valve seat 22a. A plurality of axial holes 23 are formed in the valve seat member 22 and are communicated with the pressure chamber $R_2$. The holes 23, the chamber $R_3$ and the radial hole 21 constitute a second communicating passage $L_2$ according to the invention, and the liquid flow therethrough is controlled by the second damping force generating mechanism 25 and the adjusting valve 27. The second damping force generating valve mechanism 25 generates a relatively small damping force as compared with the first damping force generating valve mechanism 13. The adjusting valve 27 is secured to an actuating rod 29 which extends through a coaxial bore in the piston rod 4 to the outside. The outer end of the rod 29 is connected to an actuating mechanism such as an electric motor (not shown).

Figure 4:
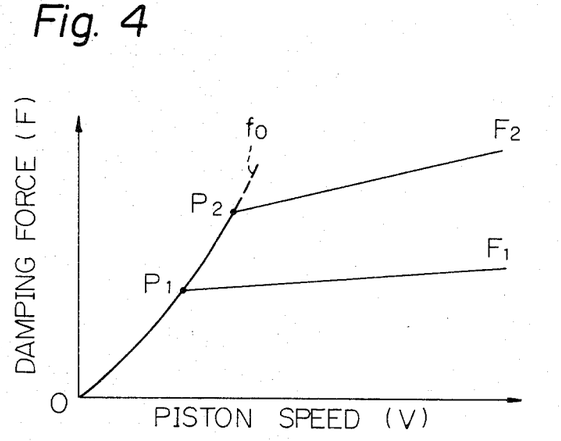
FIG. 4 is a diagram showing the relationship between the damping force and the piston speed of the damper of FIG. 1.

In operation, when the piston 5 and the piston rod 4 move in the upward or downward direction in the extension or contraction stroke of the damper and when the piston speed V is low, the valves 9, 11 and 25 are maintained closed, and the liquid flow between chambers $R_1$ and $R_2$ solely passes through the orifice passage 15 which defines an increasing portion (line $OP_1P_2$) of the damping force piston speed diagram depicted in FIG. 4.

Figure 3:
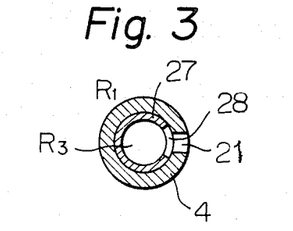
FIG. 3 is a partial cross-sectional view taken along line III—III in FIG. 1.

The adjusting valve 27 acts to selectively fully open or fully close the radial hole 21 and FIG. 3 shows the fully open condition. When the adjusting valve 27 fully closes the hole 21, no liquid flows through the second passage $L_2$ and, when the piston speed further increases, the damping force generating valve mechanism 13 opens to permit the liquid flow between chambers $R_1$ and $R_2$ through either of the valves 9 and 11, and a relatively large damping force is generated. Such condition is depicted by line $P_2F_2$ in FIG. 4.

When the adjusting valve 27 is rotated to the condition shown in FIG. 3, the second damping force generating valve 25 opens at a relatively small pressure difference between the chambers $R_1$ and $R_2$. The damping force at such condition is shown as line $P_1F_1$ in FIG. 4.

In this embodiment, the second damping force generating valve mechanism 25 generates a relatively large damping force in the extension stroke as compared with the damping force by the valve 25 in the contraction stroke, since the force for deflecting the outer circumference of the disc in the direction of arrows A to form a predetermined passage area is smaller than the force for deflecting the inner circumference of the disc in the direction of arrows B in forming the predetermined passage area. Such characteristics of the damper is particularly advantageous in utilizing the damper of an the suspension system in automotive vehicle.

Figure 5:
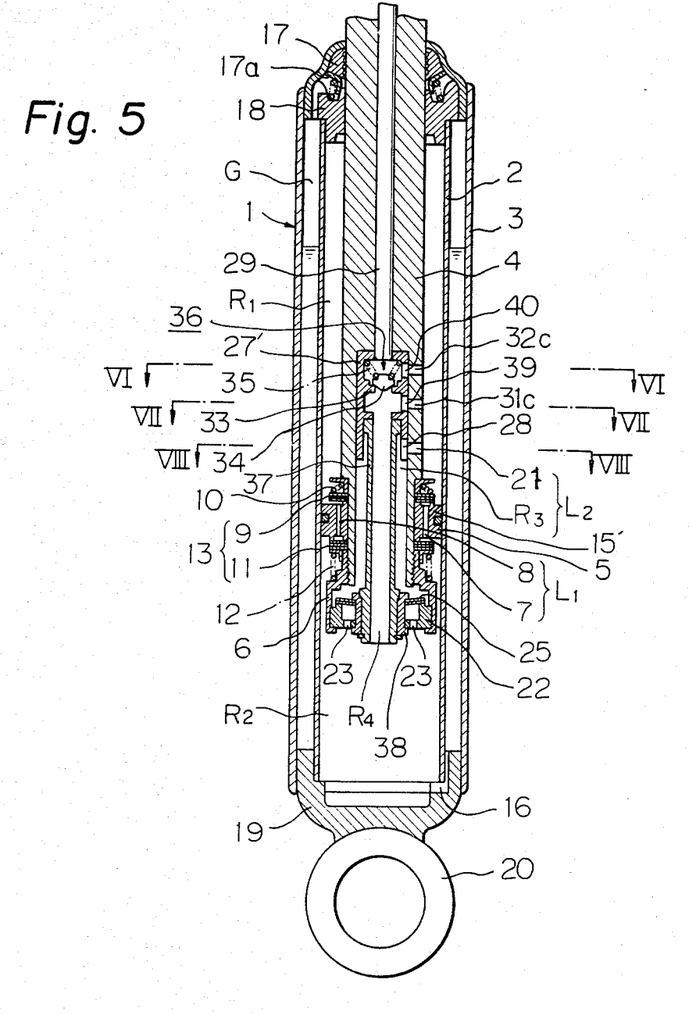
FIG. 5 is a longitudinal sectional view of a hydraulic damper according to a second embodiment of the invention.

FIG. 5 shows a second embodiment wherein parts corresponding to the first embodiment are depicted by the same reference numerals. The construction of the piston 5 and the first damping force generating valve mechanism 13 is similar to the first embodiment, but the orifice passage 15 acting as a fixed orifice is omitted. There is provided in the inner chamber $R_3$ a coaxial hollow tube 37 with the lower end thereof being secured to the lower end of the hollow nut 6 through a valve seat member 22 generally similar to the valve set member 22 in the first embodiment and a valve retaining member 38 which is generally similar to the valve retaining member 26 in the first embodiment. The upper end of the hollow tube 37 rotatably and sealingly engages with a rotatable valve member 27' which is rotatably disposed in the upper end of the inner chamber $R_3$. The valve member 27' has a cylindrical wall slidably engaging with the inner surface of the hollow portion of the piston rod 4. The hollow tube 37 defines therein a second inner chamber $R_4$ which is permanently communicating with the lower liquid chamber $R_2$. Similarly to the first embodiment, second damping force generating valve mechanism 25 generating a relatively small damping force is disposed between the lower liquid chamber $R_2$ and the inner chamber $R_3$ which is referred as a first inner chamber in the second embodiment.

The valve member 27' has an elongated cylindrical wall and radially inwardly extending flanges partitioning the cylindrical wall into upper, intermediate and lower sections. A relatively large cutout 28 is, similarly to the first embodiment, provided in the lower section of the cylindrical wall of the valve member 27' for selectively communicating the first inner chamber $R_3$ with the upper liquid chamber $R_1$ through the radial hole 21 in the piston rod 4. In the first embodiment, the valve member 27 is rotated by about 90 degrees to simply open or close the radial hole 21. However, the valve member 27' takes three angular postions such as 0, 120 and 240 degrees, and the cutout 28 communicates the chambers $R_1$ and $R_3$ at two angular positions. For this end, there are provided two circumferentially spaced radial holes 21 as shown in FIG. 8.

Figure 6:
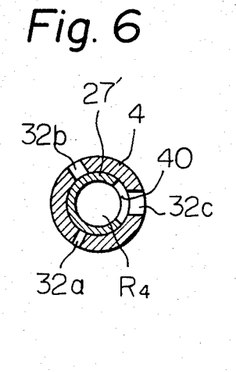
FIG. 6 is a cross-sectional view taken along line VI—VI in FIG. 5.
Figure 7:
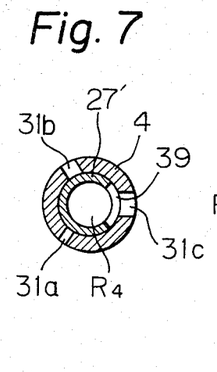
FIG. 7 is a cross-sectional view taken along line VII—VII in FIG. 5.

In the intermediate section of the cylindrical wall of the valve member 27' there is provided, as shown in FIG. 7, a cutout 39 is formed to communicate the second inner chamber $R_4$ with the upper liquid chamber $R_1$. Three circumferentially spaced holes 31a, 31b and 31c having different cross-sectional areas are provided in the piston rod 4 to cooperate with the cutout 39. The radial holes 31a, 31b and 31c act as an adjustable orifice for defining the increasing portion of a characteristic diagram which will hereinafter be explained. Further, as shown in FIG. 6, there is provided in the upper section of the cylindrical wall of the valve member 27' a cutout 40 for cooperating with three circumferentially spaced radial holes 32a, 32b and 32c formed in the piston rod 4. The cutout 40 in the valve member 27' and radial holes 32a 32b and 32c act to communicate the second inner chamber $R_4$ with the upper liquid chamber $R_1$ only in the contraction stroke of the damper. A check valve 34 receiving the spring force of a coil spring 35 normally seats on a valve seat formed in the radially inwardly extending flange 33 which partitions the upper and the intermediate sections of the cylindrical wall of the valve member 27'. The check valve 34 opens when liquid flows from the second inner chamber $R_4$ to the upper liquid chamber $R_1$ through the cutout 40 and one of radial holes 32a, 32b and 32c, but the check valve 34 prevents liquid flow in the reverse direction. The effective cross-sectional areas of the holes 32a, 32b and 32c, and holes 31a, 31b and 31c are determined such that the holes 31a and 32a are the smallest and the holes 31c and 32c are the largest as shown in FIGS. 6 and 7. The valve member 27' is secured to an actuating rod 29 which extends through the piston rod 4 and is operable from the outside.

Figure 8:
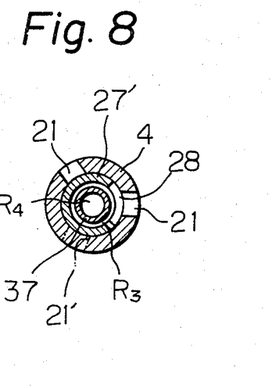
FIG. 8 is a cross-sectional view taken along line VIII—VIII in FIG. 5.

It will be understood from FIGS. 6, 7 and 8 that when the valve member 27' takes the position shown in the drawings, the upper chamber $R_1$ is connected with the first inner chamber $R_3$ through the radial hole 21 which does not have any throttling effect even when the second damping force generating valve 25 is fully open. The upper chamber $R_1$ is also connected with the second inner chamber $R_4$ through a relatively large radial hole 31c and through the check valve 34 and relatively large radial hole 32c. In the drawings the holes 31c and 32c are comparable to the hole 21 but, the holes 31c and 32c are sufficiently smaller than the hole 21 such that a predetermined throttling effect generates on the liquid flow passing through the hole 31c or 32c. This position of the valve member 27' is referred to hereinafter as the "c" position.

When the valve member 27' is rotated by 120 degrees in the counterclockwise direction as viewed in FIGS. 6, 7 and 8, the upper chamber $R_1$ is connected to the first inner chamber $R_3$ through another radial hole 21 having a large cross-sectional area similar to the first mentioned radial hole 21. The chamber $R_1$ is also connected with the second inner chamber $R_4$ through the radial hole 31b and through the radial hole 32b and the check valve 34. The cross-sectional areas of the holes 31b and 32b are smaller than the holes 31a and 32a. This position of the valve member 27' is referred to as the "b" position.

When the valve member 27' is further rotated by 120 degrees in the counterclockwise direction as viewed in the drawings, the communication between the chambers $R_1$ and $R_3$ is intercepted since any opening is not provided in the position 21' shown by broken lines in FIG. 8. The chamber $R_1$ is connected with the chamber $R_4$ through relatively small radial hole 31a and through relatively small radial hole 32a and the check valve 34. This position of the valve member 27' is referred to as the "a" position.

Figure 9:
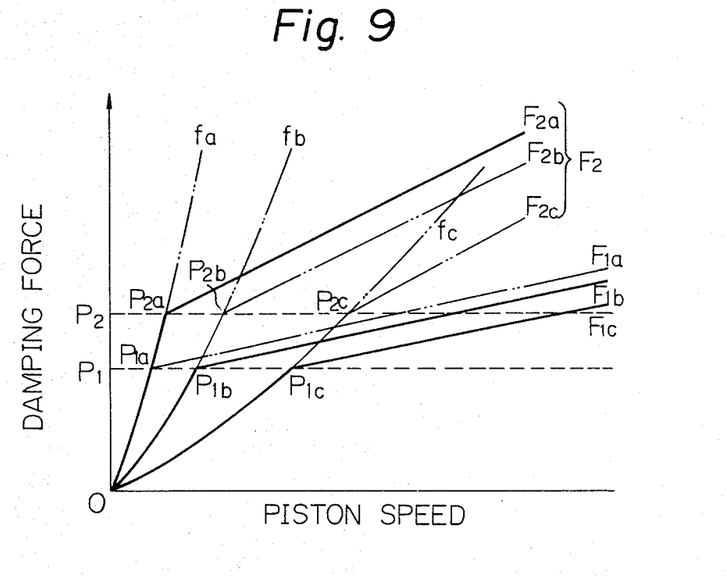
FIG. 9 is a diagram showing the relationship between the damping force and piston speed of the damper of FIG. 5.

In operation, when the piston 5 and the piston rod 4 move upward in the extension stroke of the damper and the valve member 27' takes the "c" position, the radial hole 31c acts as an orifice for determining the increasing portion of the characteristic diagram as shown in FIG. 9 and defines line $OP_{1c}$. Thereafter, the second damping force generating valve mechanism 25 opens and the damping force will increase along line $P_{1c}F_{1c}$ in FIG. 9.

When the valve member 27' takes the "b" position the damping force will change along solid line $OP_{1b}F_{1b}$ in the extension stroke of the damper.

When the valve member 27' takes the "a" position, the second damping force generating valve mechanism 25 does not generate any damping force since the communication between the upper chamber $R_1$ and the first inner chamber $R_3$ is prevented by the valve member 27'. The damping force is depicted by solid line $OP_{2a}F_{2a}$ wherein the increasing portion $OP_{2a}$ is defined by the orifice formed by the radial hole 31a and the portion $P_{2a}F_{2a}$ is defined by the disc valve 11 of the first damping force generating valve mechanism 13.

In the contraction stroke of the damper, the check valve 34 opens and, thus, the inclination of the increasing portions $Of_a$, $Of_b$ and $Of_c$ becomes gradual, but the characteristic curve is essentially similar to FIG. 9.

Various changes or modifications can easily be made with respect to the size and arrangement of the valve member 27' and radial holes 21, 31a–31c and 32a–32c. For example, the second radial hole 21 on the leftside upper portion in FIG. 8 may be omitted, and then the damping force at the "b" position of the valve member 27' changes along line $OP_{2b}F_{2b}$ in FIG. 9. Further, the valve member 27' may have four or more positions. Further, the hole 31a defining the smallest orifice may be replaced by a fixed orifice 15' as shown in broken lines in FIG. 5.

As described heretofore, according to the invention, it is possible to adjust the damping force over a wide range so as to conform with the requirements for a damper of automotive vehicles.

Figure 10:
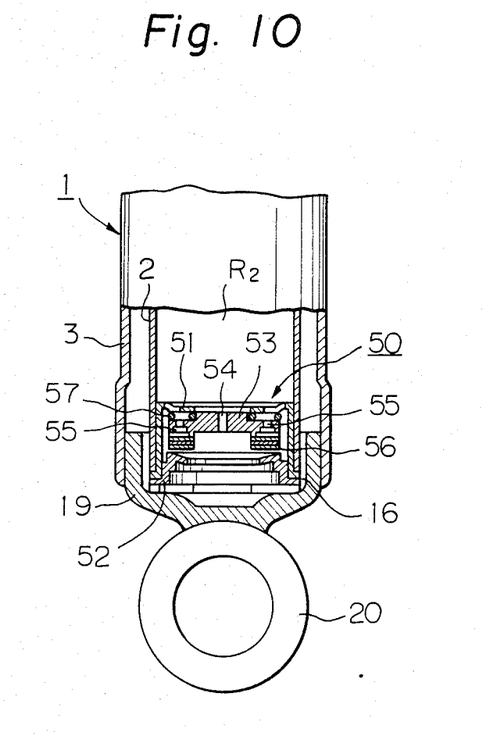
FIG. 10 is a partial sectional view of a hydraulic damper according to the invention and showing a bottom valve.

FIG. 10 shows a bottom valve 50 which may be mounted in the lower end of the cylinder 2 of the hydraulic damper of FIG. 5 for further reducing the damping force in the contraction stroke and at the "c" position of the adjusting valve 27'. The cross-sectional area of the radial hole 32c is sufficiently increased such that a damping force will not be generated at the second damping force generating mechanism 25 in the contraction stroke.

The bottom valve 50 comprises an inverted cup-shaped upper cap 51 and an inverted dish shaped lower cap 52 fitted on the lower end portion of the cylinder 2, a valve seat member 53 vertically displaceably interposed between the upper and lower caps 51 and 52, a spring 57 disposed between the upper cap 51 and the valve seat member 53 for biasing the valve seat member 53 toward the lower cap 52, and an annular valve disc 56 consisting of one or more mutually overlapping annular discs. The valve seat member has an orifice 54 in the central portion and a plurality of through holes 55 in the circumferential portion.

When the piston rod 4 displaces upward in the extension stroke, the valve seat member 53 moves upward against the spring force of the spring 57 to form a relatively large opening between the circumference of the lower cap 52 and the valve disc 56, as shown in FIG. 10, so that the liquid in the reservoir chamber can relatively freely flow into the lower liquid chamber $R_2$ to compensate for the outward displacement of the piston rod 4 leaving the cylinder 2.

In the contraction stroke of the damper and when the adjusting valve 27' is at the "c" position, the liquid in the lower liquid chamber $R_2$ flows into the upper liquid chamber $R_1$ through the second inner chamber $R_4$, the check valve 34 and the hole 32c having a large cross-sectional area without generating any substantial damping force, liquid in the lower liquid chamber $R_2$ corresponding to the ingress of the piston rod 4 into the cylinder 2 flows into the reservoir chamber through the orifice passage 54 and through a circumferentially extending axial clearance formed between the inner circumference of the valve disc 56 and the corresponding valve seat defined on the lower surface of the valve seat member with the inner circumference of the valve disc 56 being deflected downwards. The damping force of the bottom valve can be reduced as desired.

It will be understood that the bottom valve illustrated in FIG. 10 has substantially no effect on the damping force characteristics of the damper in the contraction stroke at the "a" and "b" positions of the adjusting valve 27' and in the extension stroke at the "a", "b" and "c" positions of the adjusting valve 27'. However, the bottom valve is advantageous in reducing the pressure of the gas enclosed in the reservoir chamber.

Figure 11:
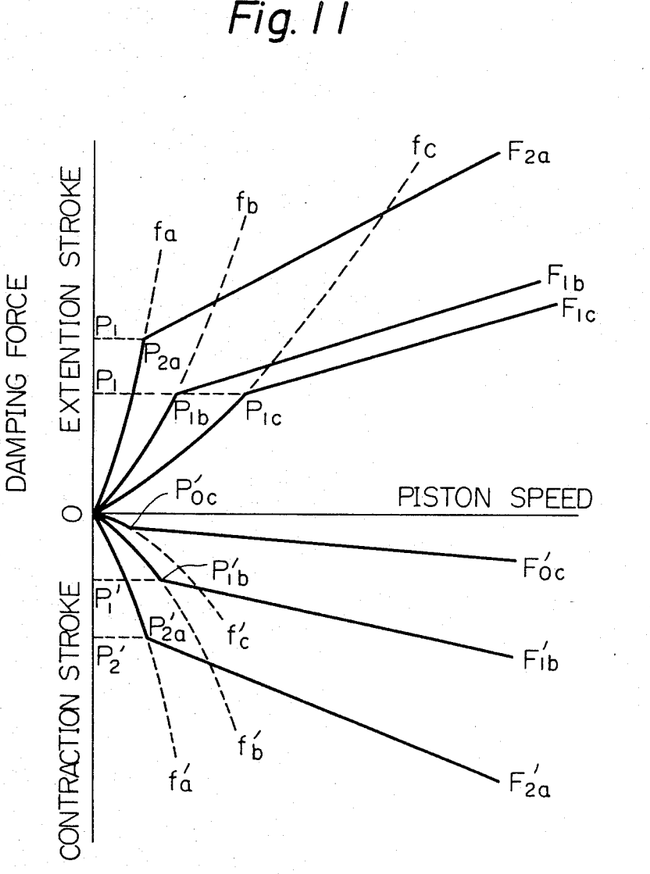
FIG. 11 is a characteristic diagram of the hydraulic damper of FIG. 5 as modified to have the bottom valve of FIG. 10.

FIG. 11 shows a damping force piston speed diagram of the hydraulic damper having the bottom valve of FIG. 10. The upper half of the diagram showing the extension stroke is generally similar to FIG. 9, and it will not be necessary to explain the same in detail. In the extension stoke, the bottom valve does not generate substantial damping force and, the check valve 34 is closed. The lines $Of_a$, $Of_b$ and $Of_c$ are determined respectively by the orifices 31a, 31b and 31c.

In the contraction stroke, the lines $Of'_a$ and $Of'_b$ are respectively determined by the effective passage area of orifices $31a + 32a$ and orifices 31b and 32b respectively. The line $P'_{2a}F'_{2a}$ is mainly determined by the damping force generating valve 9, and the line $P'_{1b}F'_{1b}$ is mainly determined by the damping force generating valve 25. Further, the line $Of'_c$ is mainly determined by the orifice 54 in the bottom valve, and the line $P'_{0c}F'_{0c}$ is mainly determined by the bottom valve.

As described heretofore, according to the invention, it is possible to adjust the damping force of the damper at various desired modes and over a wide range thereby satisfying various requirements of automotive vehicles.

The invention is not limited to the embodiments described and various changes or modifications can easily be made by those skilled in the art. For example, the illustrated embodiments relate to a dual-tube type hydraulic damper. However, the invention can equally be applied to a single tube type hydraulic damper. The damping force generating mechanisms shown in the illustrated embodiments mainly consist of annular resilient discs, but any other types of damping force generating mechanisms may be utilized. Further, the adjusting valves 27 and 27' shown in the illustrated embodiments are rotated by an actuating rod 29 which passes through the piston rod. However, the adjusting valves 27 and 27' may be rotated by any other suitable actuating mechanisms such as hydraulic, electric or magnetic actuators.

What is claimed is:

1. A hydraulic damper of the adjustable damping force type comprising:
    a piston working in a cylinder and partitioning the interior thereof into two liquid chambers;
    a piston rod secured to said piston and extending to the outside of said cylinder;
    a first passage means for connecting said two liquid chambers;
    a first damping force generating valve means comprising first and second oppositely opening resilient valve disc means provided in said first passage means for generating a relatively high damping force both in the extension and contraction strokes of said damper;
    a second passage means for connecting said two liquid chambers independently from said first passage means;
    a second damping force generating valve means comprising a resilient valve disc provided in said second passage means for generating a relatively low damping force both in the extension and contraction strokes of said damper as said valve disc opens in respective opposite directions; and adjusting valve means provided in said piston rod and controlling the effective passage area of said second passage means.

2. A hydraulic damper as claimed in claim 1, wherein said adjusting valve means is operable from the outside of said damper.

3. A hydraulic damper as claimed in claim 1, wherein said first passage means is formed through said piston, and said second passage means is provided in an inner end portion of said piston rod which extends through and is connected to said piston.

4. A hydraulic damper as claimed in claim 1, further comprising an orifice passage connecting said two liquid chambers separately from said first and second passage means.

5. A hydraulic damper as claimed in claim 4, wherein the effective passage area of said orifice passage is also controlled by the adjusting valve means.

6. A hydraulic damper as claimed in claim 4, wherein said orifice passage includes a branch passage having therein one-way valve means for closing said branch passage in either one of the extension and contraction strokes of said damper and for permitting liquid flow in said branch passage in the other of the extension and contraction strokes of said damper.

* * * * *